(12) United States Patent
Topliss

(10) Patent No.: US 8,730,599 B2
(45) Date of Patent: May 20, 2014

(54) PIEZOELECTRIC AND MEMS ACTUATOR

(71) Applicant: Apple Inc., Cupertino, CA (US)

(72) Inventor: Richard J. Topliss, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/632,963

(22) Filed: Oct. 1, 2012

(65) Prior Publication Data

US 2014/0092493 A1 Apr. 3, 2014

(51) Int. Cl.
*G02B 7/02* (2006.01)

(52) U.S. Cl.
USPC .......................................... 359/824

(58) Field of Classification Search
USPC .......... 359/824, 811, 819, 822, 696; 310/311, 310/323.06, 323.21
See application file for complete search history.

(56) References Cited

U.S. PATENT DOCUMENTS

| | | | |
|---|---|---|---|
| 6,940,209 B2 | 9/2005 | Henderson | |
| 7,170,214 B2 | 1/2007 | Henderson et al. | |
| 7,309,943 B2 | 12/2007 | Henderson et al. | |
| 7,339,306 B2 | 3/2008 | Henderson | |
| 7,786,648 B2 | 8/2010 | Xu et al. | |
| 7,826,734 B2 | 11/2010 | Shirono et al. | |
| 8,013,494 B2 | 9/2011 | Morioke | |
| 8,059,346 B2 * | 11/2011 | Henderson | 359/824 |
| 2003/0227559 A1 | 12/2003 | Rouvinen et al. | |
| 2010/0039715 A1 | 2/2010 | Xu et al. | |
| 2010/0289381 A1 | 11/2010 | Xu et al. | |
| 2011/0018390 A1 | 1/2011 | Guidarelli et al. | |
| 2011/0063743 A1 | 3/2011 | Ko et al. | |
| 2011/0101894 A1 | 5/2011 | Sattler et al. | |
| 2011/0106891 A1 | 5/2011 | Henderson et al. | |
| 2011/0141584 A1 | 6/2011 | Henderson et al. | |
| 2011/0241851 A1 | 10/2011 | Henderson et al. | |
| 2011/0242403 A1 | 10/2011 | Kawamura et al. | |
| 2012/0019185 A1 | 1/2012 | Guidarelli et al. | |
| 2012/0063000 A1 | 3/2012 | Batchko et al. | |
| 2013/0120855 A1 * | 5/2013 | Hu et al. | 359/696 |

* cited by examiner

*Primary Examiner* — Tuyen Tra
(74) *Attorney, Agent, or Firm* — Blakely, Sokoloff, Taylor & Zafman LLP

(57) ABSTRACT

A micro-electro-mechanical systems (MEMS) lens actuator having a support frame including a stationary outer portion surrounding an inner receiving portion. A piezoelectric drive member is positioned within the inner receiving portion and attached to the stationary outer portion. A first movable lens support member and a second movable lens support member are frictionally engaged with opposing ends of the piezoelectric drive member at a contact point along each of the opposing ends using a preload force at the contact point. The piezoelectric drive member may have a first actuation mode which drives movement of the first movable lens support member and the second movable lens support member in a same direction and a second actuation mode which drives movement of the first movable lens support member and the second movable lens support member in different directions.

25 Claims, 12 Drawing Sheets

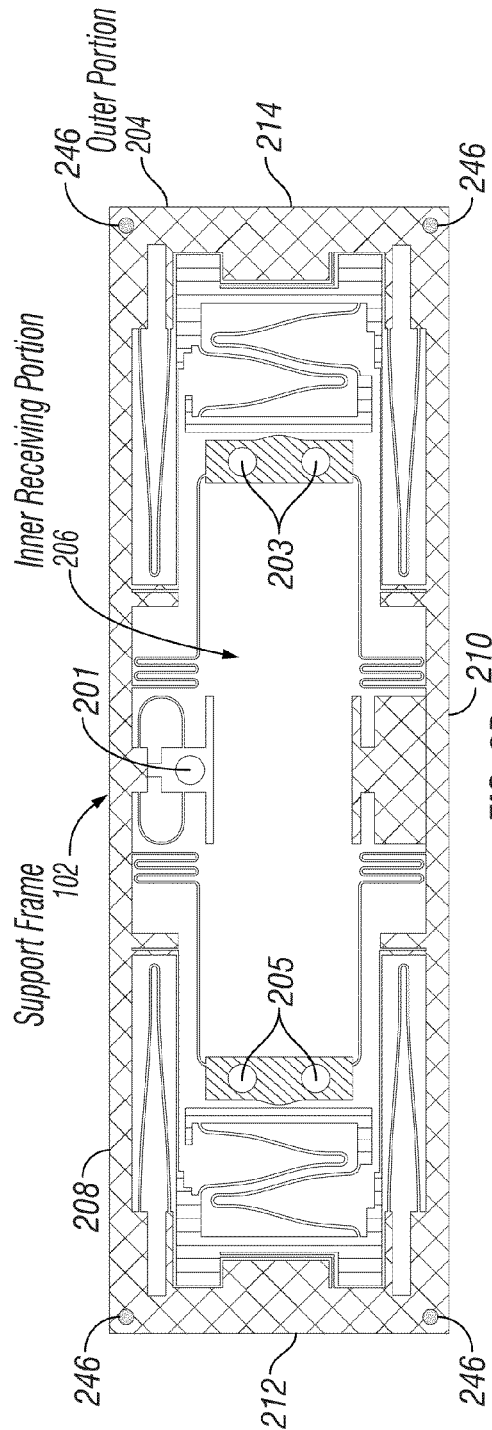
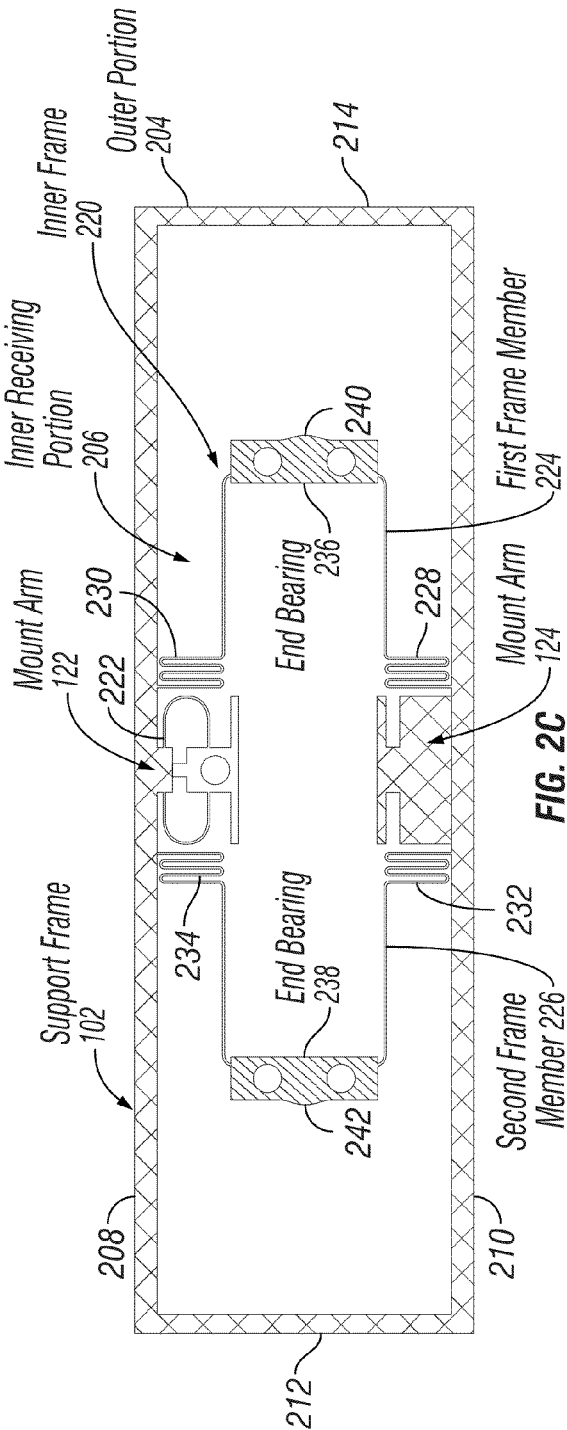
FIG. 2B
FIG. 2C

PIEZOELECTRIC AND MEMS ACTUATOR

FIELD

An embodiment of the invention is directed to a micro-electro-mechanical system (MEMS) actuator for a camera module that may be integrated within a mobile electronic device such as a smartphone. Other embodiments are also described and claimed.

BACKGROUND

Miniature cameras are becoming increasingly common in mobile electronic devices such as smartphones. For such high-end miniature cameras, it is common to incorporate autofocus (AF), whereby the object focal distance is adjusted to allow objects at different distances to be in sharp focus at the image plane and to be captured by the digital image sensor. There have been many ways proposed for achieving such adjustment of focal position, however most common is to move the whole optical lens as a single rigid body in a direction parallel to the optical axis. Positions of the lens closer to the image sensor correspond to object focal distances further from the camera.

Demands on improvements to performance of such miniature cameras are constant, as are demands for continued miniaturization. In particular, high image quality requires the lens motion in a direction parallel to the optical axis to be accompanied by minimal parasitic motion in the other degrees of freedom. As a result, the lens motion is limited to single degree of freedom, for example in a direction parallel to the optical axis, with no tilt about axes orthogonal to the optical axis. This requires the lens suspension mechanism to be stiff to such parasitic motions. However, given the need to control the lens position to around 1 micron, such suspension mechanisms must also account for friction.

Various types of autofocus actuators have been proposed for use in miniature cameras. One exemplary autofocus actuator is a piezoelectric actuator, which uses ultrasonic vibrations to drive lens movement. Existing piezoelectric actuators, however, are relatively large in size and costly to manufacture.

SUMMARY

An embodiment of the invention is a MEMS actuator that incorporates a piezoelectric plate driven at ultrasonic frequencies to move a body of interest. In embodiments where the MEMS actuator is used in a camera, for example a miniature camera, the body of interest may be a lens. The actuator support frame may be fabricated largely from a silicon wafer with virtually all of the required actuating structures integrally formed within the frame. In one embodiment, the frame may be a relatively thin structure, with a rectangular profile. The thin rectangular profile in combination with the piezoelectric plate yields a complete actuator that is very thin in one direction, making it possible to package next to a large lens.

The actuator is further configured to deliver controlled motion in at least two different degrees of freedom, for example, a translational motion and a rotational motion. Representatively, the actuator is capable of moving an associated lens along its optical axis to achieve an autofocus (AF) function (i.e., translation motion). In another embodiment, the actuator could be used to deliver optical image stabilization (OIS) functionality (i.e., rotational motion). In particular, the actuator can tilt one or more of the lens and image sensor within the associated camera in such a way to compensate for user handshake. The OIS functionality allows for longer exposure times in lower light conditions.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

FIG. 2B is a plan view of one embodiment of the actuator of FIG. 2A with the piezoelectric drive member removed.

FIG. 2C illustrates a plan view of some of the components of the actuator illustrated in FIG. 2A which are used to support the piezoelectric drive member.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Figure 1A:
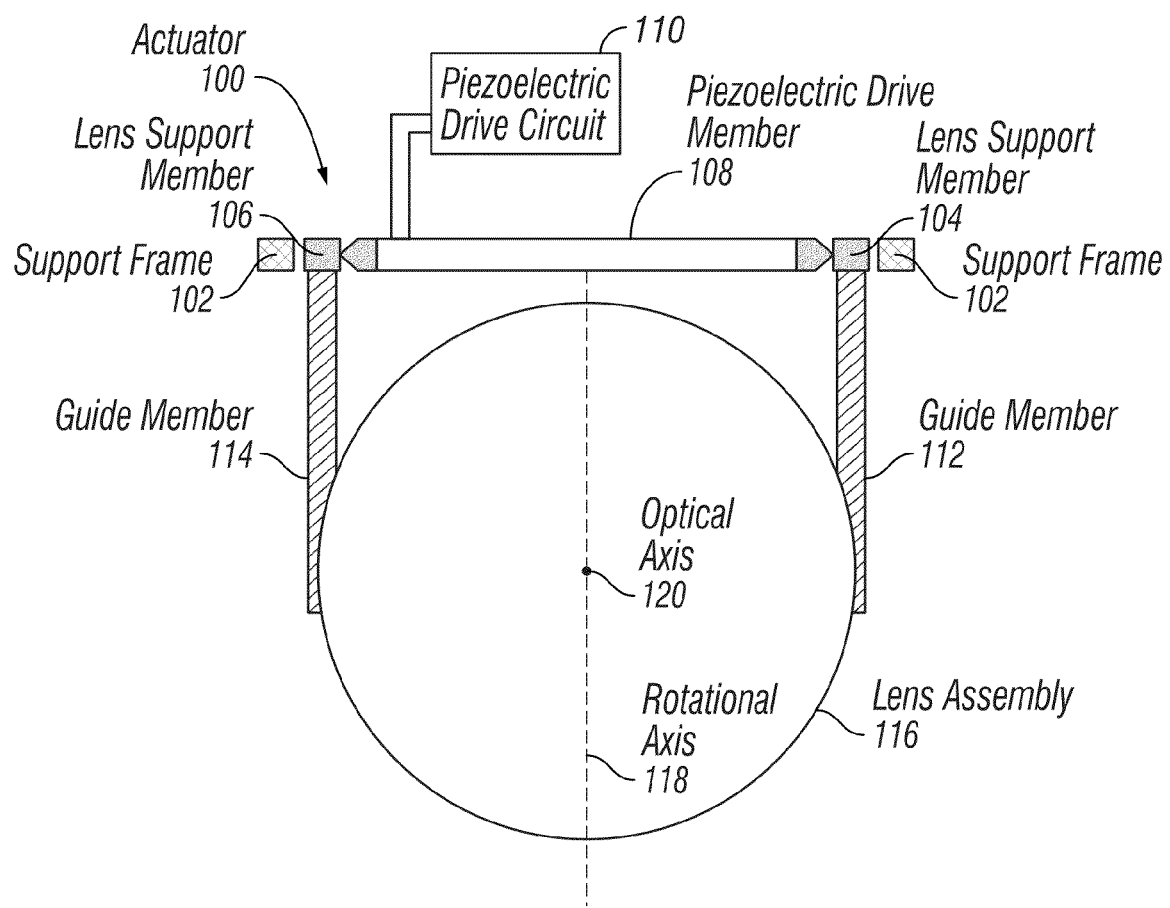
FIG. 1A is a top plan view of one embodiment of an actuator attached to a lens assembly.

FIG. 1A illustrates a top cross-sectional view of one embodiment of an actuator attached to a lens assembly. Actuator 100 may be configured for use in a camera, more specifically a miniature camera. In the case of a camera implementation, one or more of actuator 100 can be used to deliver a controlled motion to a lens assembly 116 or other imaging component associated with the camera (e.g., an image sensor) to drive an AF and/or OIS operation. In this aspect, actuator 100 may be configured to drive movement of, in one embodiment, lens assembly 116 according to at least two different degrees of freedom. One of the degrees of freedom may be a translational motion in which actuator 100 moves lens assembly 116 in a direction parallel to its optical axis during an AF operation. Another degree of freedom may be a rotational motion in which actuator 100 rotates or tilts lens assembly 116 about rotational axis 118 during an OIS operation. Rotational axis 118 may be orthogonal to optical axis 120. Since actuator 100 may be used to deliver controlled movement according to two degrees of freedom, the same (or similar) actuator architecture can be used for both AF and OIS functions (or other camera functions, such as panning).

Referring now in more detail to FIG. 1A, actuator 100 includes a support frame 102 which can support and contain therein each of the actuator components. Support frame 102 may be mounted within a camera module associated with lens assembly 116. Since actuator 100 may be implemented within a relatively small device such as a miniature camera, it is desirable for the actuator footprint to remain as small as possible. Support frame 102 may therefore be formed by a MEMS structure fabricated from a silicon wafer, which undergoes various etching and deposition processes to create a single integrally formed module that includes virtually all of the actuator components necessary to drive movement of the desired object (e.g., lens assembly 116). Since support frame 102 is formed from a silicon wafer, support frame 102 and the components formed therein, have a substantially flat and relatively thin profile. In this aspect, actuator 100 has an overall size and shape that can be packaged next to, and used with, lenses of a variety of sizes, including larger lenses.

Lens support members 104 and 106 are formed inward from the end portions of support frame 102. Lens support members 104 and 106 frictionally engage opposing ends of piezoelectric drive member 108, which is positioned within support frame 102, between lens support members 104 and 106. Lens assembly 116 is mounted to lens support members 104, 106 by, for example, guide members 112, 114. Guide members 112, 114 may have some compliance to protect any associated components during a drop-test. Lens assembly 116 may be mounted such that its rotational axis 118, for the purposes of an OIS functionality, is perpendicular to a longitudinal axis of piezoelectric drive member 108 and the optical axis 120 is orthogonal to rotational axis 118.

Piezoelectric drive member 108 may be electronically connected to a piezoelectric drive circuit 110 which can be used to apply a voltage to piezoelectric drive member 108. Application of a voltage to piezoelectric drive member 108 in turn deforms piezoelectric drive member 108 causing it to move lens assembly 116 according to the desired degree of freedom.

Figure 1B:
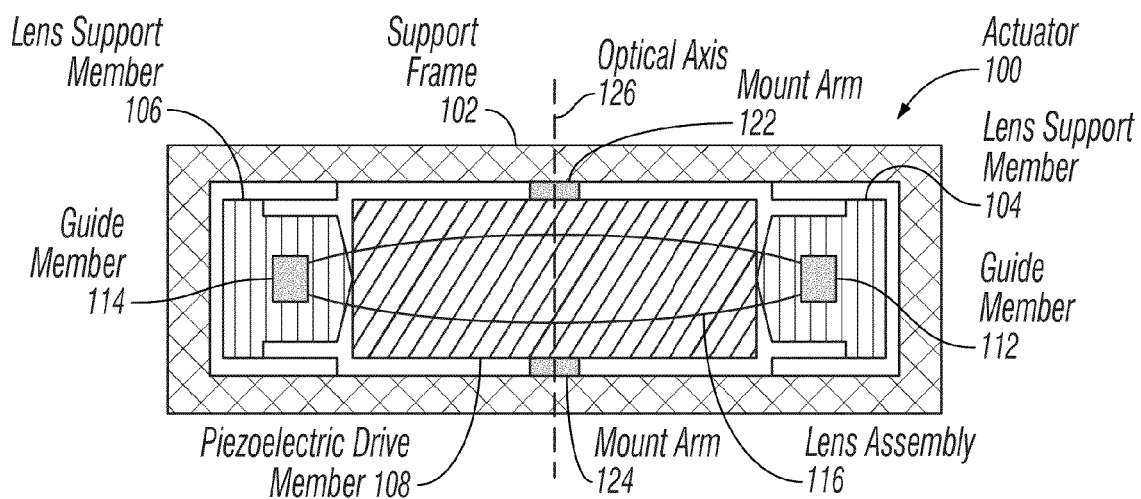
FIG. 1B is a front plan view of the actuator of FIG. 1A.

FIG. 1B illustrates a front plan view of actuator 100 of FIG. 1A. From this view, it can be seen that each of the lens support members 104, 106 and piezoelectric drive member 108 are supported within support frame 102. In one embodiment, piezoelectric drive member 108 may be a substantially rectangular plate like structure. Piezoelectric drive member 108 may be fixedly attached at its center region to support frame 102 by mounting arms 122, 124. The ends of piezoelectric drive member 108 facing lens support members 104, 106, however, are free to move. As will now be described in more detail in reference to FIG. 1C to FIG. 1E, movement of the ends of piezoelectric drive member 108 drives movement of the abutting lens support members 104, 106, and in turn, lens assembly 116.

Figure 1C:
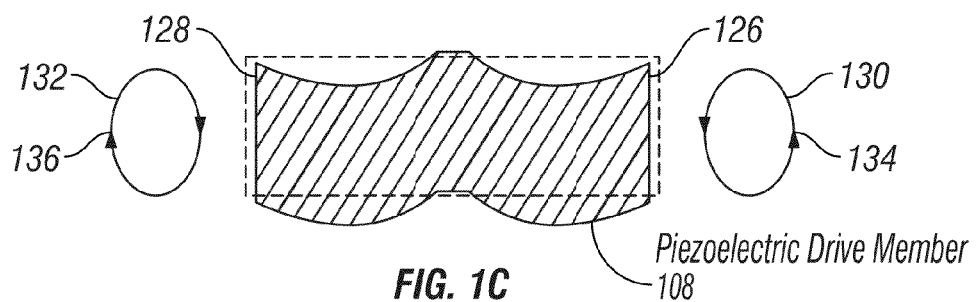
FIG. 1C is a front plan view of the piezoelectric drive member of FIG. 1A according to a first actuation mode.
Figure 1D:
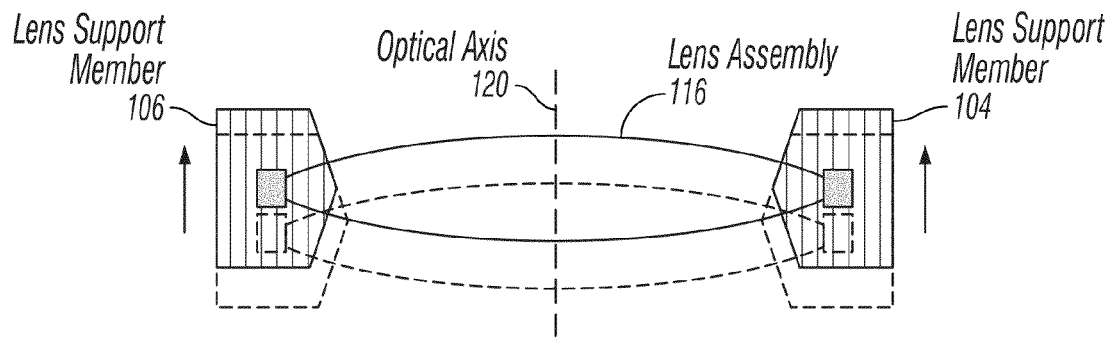
FIG. 1D is a front plan view of the lens assembly and support members of FIG. 1A when moved by the piezoelectric drive member in the first actuation mode.

FIG. 1C illustrates movement of piezoelectric drive member 108 according to a first actuation mode. To achieve the first actuation mode, a voltage is applied to piezoelectric drive member 108. The voltage symmetrically deforms piezoelectric drive member 108 as illustrated and causes the ends to move along an elliptical path at high frequency. In particular, in the illustrated embodiment, end 126 moves in a counter clockwise direction along elliptical path 130 and end 128 moves in a clockwise direction along elliptical path 132. Since the center portion of piezoelectric drive member 108 is fixedly attached to support frame 102 as previously discussed, the center portion remains stationary. Assuming this movement, also referred to as a vibration, occurs at a frequency higher than lens support members 104, 106 can respond to, owing to their inertia, it will drive movement of the lens support members 104, 106. Lens support members 104, 106 will move in a direction that is parallel to optical axis 120 and that is the same as the elliptical motion at a point furthest from the center of piezoelectric drive member 108, and hence with the highest normal load and highest friction. In other words, when end 126 of piezoelectric drive member 108 is at a 3 o'clock position 134 of elliptical path 130, a frictional force between end 126 and lens support member 104 is highest. This in turn, pushes lens support member 104 upward as illustrated by FIG. 1D. Similarly, when end 128 is at a 9 o'clock position 136 of elliptical path 132, a frictional force between end 128 and lens support member 106 is highest. This in turn, drives lens support member 106 upward as further illustrated by FIG. 1D. Since both lens support members 104, 106 move in an upward direction, lens assembly 116 will also move in this direction along optical axis 120 to achieve the AF functionality. Although piezoelectric drive member 108 is shown driving lens assembly 116 upward in the first actuation mode, it is contemplated that ends 126, 128 may be symmetrically deformed in an opposite direction and/or elliptical path direction to move lens assembly 116 in an opposite direction.

Figure 1E:
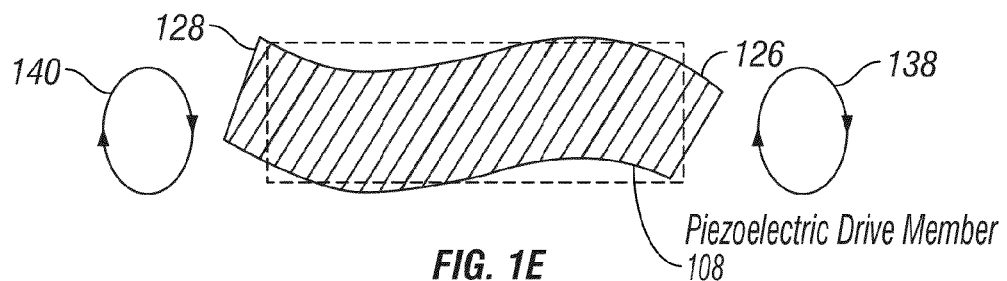
FIG. 1E is a front plan view of the piezoelectric drive member of FIG. 1A according to a second actuation mode.
Figure 1F:
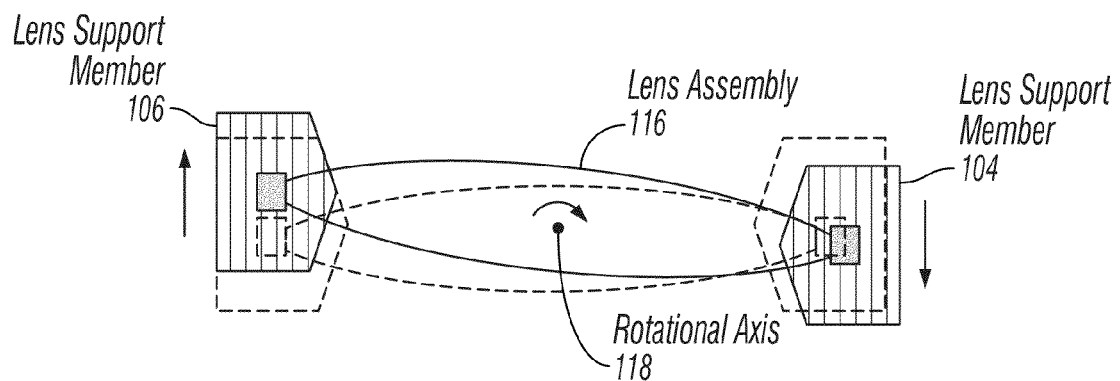
FIG. 1F is a front plan view of the lens assembly and support members of FIG. 1A when moved by the piezoelectric drive member in the second actuation mode.

FIGS. 1E and 1F illustrate movement of piezoelectric drive member 108 according to a second actuation mode that can be used to tilt lens assembly 116. In particular, as can be seen from this embodiment, when the voltage is applied, piezoelectric drive member 108 is anti-symmetrically deformed. In this case, both of ends 126 and 128 move in a clockwise direction along elliptical path 138 and elliptical path 140, respectively. This in turn, causes lens support member 104 to move in a downward direction and lens support member 106 to move in an upward direction. Movement of lens support members 104, 106 in opposite directions rotates or tilts lens assembly 116 in a clockwise direction along rotational axis 118 to achieve an OIS functionality. It is to be recognized that ends 126, 128 may also be driven along a counterclockwise elliptical path to tilt lens assembly 116 in a counter clockwise direction. Thus, as can be understood from the foregoing discussion, both a translational and a rotational movement, in other words two different degrees of freedom, can be achieved using actuator 100.

Figure 2A:
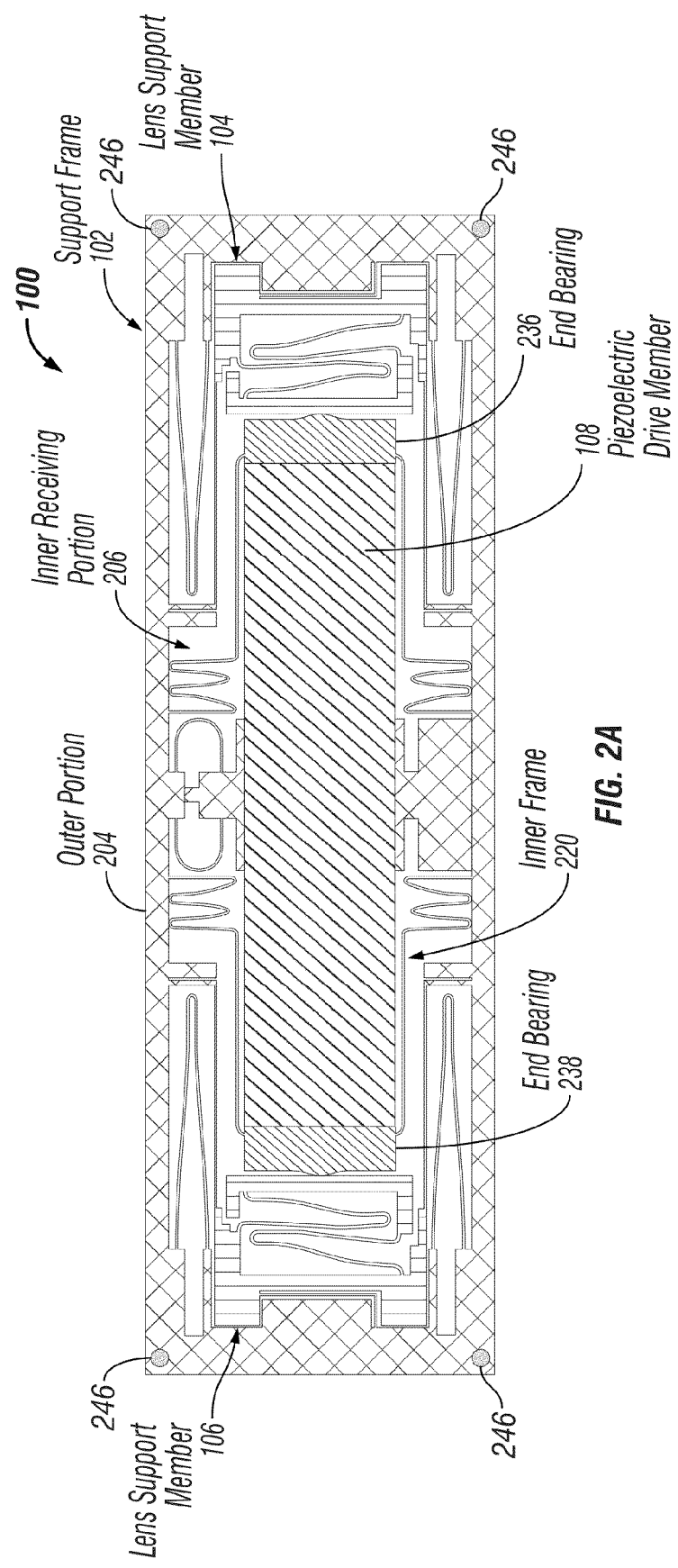
FIG. 2A is a plan view of one embodiment of an actuator having a piezoelectric drive member.

With this general overview of the operation of actuator 100 in mind, the structure of one embodiment of actuator 100 and the various components used to support piezoelectric drive member 108 and drive movement of lens assembly 116 will now be described in more detail in reference to FIG. 2A-2E. FIG. 2A is a plan view of one embodiment of an actuator. As previously discussed, actuator 100 may be a MEMS actuator configured for use in a device such as a camera, more specifically a miniature camera, or any other miniature device requiring movement according to at least two degrees of freedom. The two degrees of freedom may be, for example, a translational and a rotational motion. For example, in the AF mode, actuator 100 moves the associated lens in a direction parallel to its optical axis (e.g., translational motion) while in the OIS mode, actuator 100 rotates the associated lens along an axis perpendicular to the optical axis (e.g., rotational motion) thereby tilting the lens to compensate for user handshake. It is noted that actuator 100 may also move the image sensor in the OIS mode to compensate for user handshake.

Support frame 102 may be a MEMS support structure, which supports and contains each of the actuator components therein. Various metallic electrode layers to route electrical connections to the components may also be formed within support frame 102. Since support frame 102 is formed from a silicon wafer, support frame 102 and the components formed therein, have a substantially flat and relatively thin profile. In one embodiment, support frame 102 may have a rectangular shape and each of the actuator components may be formed within the bounds of the support frame 102. It is noted, however, that although a rectangular support frame 102 is illustrated in FIG. 2A, support frame 102 may have other shapes, for example, a square, triangular, circular or elliptical shape.

Support frame 102 may include an outer portion 204 that can be mounted (e.g., screwed, welded or the like) to a support member of, for example, a camera body at points 246. Outer portion 204 defines an inner receiving portion 206. The inner receiving portion 206 is substantially open and is dimensioned to contain the various actuator components as can be more clearly seen in FIG. 2B in which piezoelectric drive member 108 is removed. In one embodiment, inner receiving portion 206 is dimensioned to contain piezoelectric drive member 108, as illustrated in FIG. 2A, and each of the actuator components needed to support piezoelectric drive member 108 and drive movement of the desired object (e.g., a lens). Each of these components will now be described in more detail in reference to FIG. 2C and FIG. 2D.

Figure 2D:
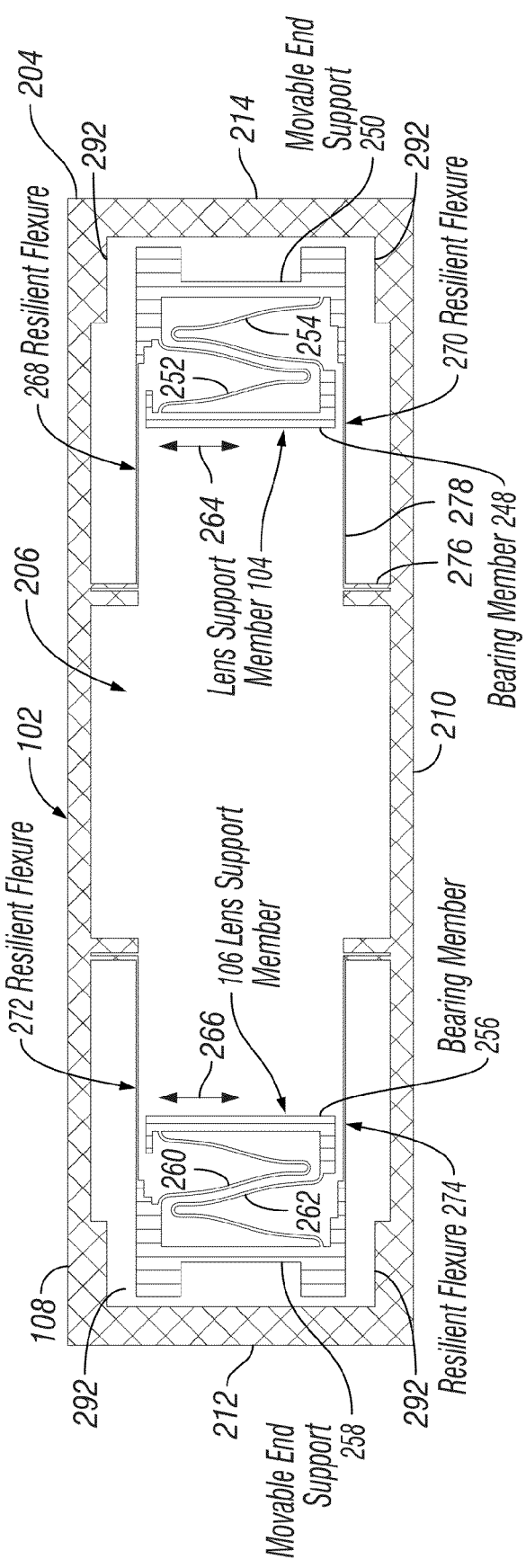
FIG. 2D illustrates a plan view of some of the components of the actuator illustrated in FIG. 2A which move the associated lens assembly.

FIG. 2C illustrates a plan view of some of the components of actuator 100 illustrated in FIG. 2A which are used to support a piezoelectric drive member within inner receiving portion 206. FIG. 2D illustrates a plan view of the remaining components of actuator 100 illustrated in FIG. 2A which move the associated lens assembly. It is noted that any of the components omitted from FIG. 2C and FIG. 2D are still present in actuator 100 as illustrated in FIG. 2A. They are simply omitted from these views for ease of illustration.

The piezoelectric drive member support components illustrated in FIG. 2C include mounting arm 122, mounting arm 124 and inner frame member 220. Mounting arm 122 and mounting arm 124 may be used to suspend the piezoelectric drive member 108 within inner receiving portion 206 as illustrated in FIG. 2A. In this aspect, mounting arm 122 may extend into inner receiving portion 206 from a top wall 208 of the support frame outer portion 204. Mounting arm 124 may extend into the inner receiving portion 206 from a bottom wall 210 of the support frame of outer portion 204. Mounting arm 122 and mounting arm 124 may be aligned with one another and extend from a center portion of their respective walls. Mounting arm 122 can be attached to the top side of piezoelectric drive member 108 and mounting arm 124 can be attached to the bottom side of piezoelectric drive member 108 to thereby mount piezoelectric drive member 108 to support frame 102 along its middle region. Since only the middle region is restrained by mounting arms 122, 124, the ends regions of piezoelectric drive member 108 are free to move.

Mounting arms 122, 124 may have the same shape and/or dimensions or a different shape and/or dimension. Representatively, in one embodiment, mounting arms 122, 124 may be 'T-shaped' support structures that are bonded onto the middle region of piezoelectric drive member 108 during assembly. The T-shape may provide a sufficient bond area between mounting arms 122, 124 and piezoelectric drive member 108 without overly limiting movement of piezoelectric drive member 108. In particular, the arms of the T's can be thinly manufactured so as to minimize any increase in stiffness along the bonding region. Mounting arms 122, 124 may, however, have any shape and size sufficient to suspend piezoelectric drive member 108 within inner receiving portion 206 while still limiting the movement of as small a portion of the piezoelectric drive member 108 as possible. The T-shape increases the bond area, whilst the arms of the T's are thin to minimize the increase in stiffness.

One or more of mounting arms 122, 124 may be a stationary structure. Alternatively, one or more of mounting arms 122, 124 may have a resilient configuration so as to account for the manufacturing tolerances of piezoelectric drive member 108 in a width direction. In the embodiment illustrated in FIG. 2C, mounting arm 122 is a resilient structure while mounting arm 124 is stationary. Representatively, mounting arm 122 may include a spring member 222 integrated within its length dimension such that when piezoelectric drive member 108 is positioned between mounting arms 122, 124, mounting arm 122 can contract to accommodate a piezoelectric drive member 108 having a width greater than the distance between the ends of mounting arms 122, 124.

Inner frame 220 may further be positioned within inner receiving portion 206 to support piezoelectric drive member 108. Inner frame 220 may be dimensioned to surround opposing ends of piezoelectric drive member 108. Since opposing ends of piezoelectric drive member 108 must be free to move during operation of actuator 100, inner frame member 220 should be a relatively compliant structure that can move along with the opposing ends. In addition, inner frame member 220 should be resilient along its length dimension so that it can accommodate piezoelectric drive member 108 and generate a pre-load force between contact surfaces of piezoelectric drive member 108 and an adjacent lens support member.

Representatively, in one embodiment, inner frame member 220 includes a first resilient frame member 224 that extends around one end of piezoelectric drive member 108 and a second resilient frame member 226 that extends around the opposing end. First resilient frame member 224 and second resilient frame member 226 combined may form a receiving space having similar dimensions to piezoelectric drive member 108. For example, resilient frame member 224 and resilient frame member 226 may form rectangular shaped pockets with interfacing openings, such that combined, they form a rectangular receiving space. First resilient frame member 224 may be positioned to one side of mounting arms 122, 124 and second resilient frame member 226 may be positioned on another side of mounting arms 122, 124. In this aspect, piezoelectric drive member 108 is evenly positioned between each of frame members 224, 226. First resilient frame member 224 may include spring members 228, 230 and second resilient frame member 226 may include spring members 232, 234. In one embodiment, spring members 228, 230, 232, 234 may be formed within ends of their respective frame members 224, 226 attached to the support frame outer portion 204. Spring members 228, 230, 232, 234 allow inner frame member 220 to expand to accommodate insertion of piezoelectric drive member 108.

In one embodiment, end bearings 236, 238 are positioned at ends of inner frame member 220 and bonded to piezoelectric drive member 108 once it is inserted within inner frame member 220. End bearings 236, 238 provide a bearing surface between each of the opposing ends of piezoelectric drive member 108 and an adjacent lens support member. In this aspect, end bearings 236, 238 may have any size and shape suitable for attaching to ends of piezoelectric drive member 108 positioned within inner frame member 220, for example, a rectangular shape. In some embodiments, end bearings 236, 238 may have a protrusions 240, 242, respectively, such that a single contact point is formed between each of the opposing ends of piezoelectric drive member 108 and the adjacent lens support member. In one embodiment, end bearings 236, 238 may be integrally formed within inner frame 220 during a manufacturing process. Alternatively, end bearings 236, 238 may be separately formed structures attached to inner frame 220 by, for example, a chemical bonding process.

In addition to each of the previously discussed components that are used to support piezoelectric drive member 108, support frame 102 may further contain various components that cause the desired object (e.g., a lens) to move in response to the vibrational movement of the piezoelectric drive member as previously discussed in reference to FIGS. 1A-1F. These components will now be described in reference to FIG. 2D.

Representatively, actuator 100 includes lens support member 104 and lens support member 106 as previously discussed in reference to FIGS. 1A and 2A. Lens support member 104 and lens support member 106 are configured to move in response to vibrational forces generated by piezoelectric drive member 108. Lens support member 104 and lens support member 106 are in turn mounted to a lens assembly (not illustrated) of the camera such that they can move the lens assembly in response to the piezoelectric drive member 108.

In one embodiment, lens support member 104 extends inwardly from a side wall 214 of support frame 102 and lens support member 106 extends inwardly from an opposing side wall 212 of support frame 102. Lens support member 104 and lens support member 106 may include bearing members 248, 256, respectively. Bearing members 248, 256 contact end bearings 236, 238, respectively, along opposing ends of the piezoelectric drive member 108 as illustrated in FIG. 2A.

Lens support member 104 may further include movable end support 250. Movable end support 250 is positioned near side wall 214 and is resiliently connected to bearing member 248 by pre-load members 252, 254. Pre-load members 252, 254 are spring-like structures that suspend bearing member 248 in front of movable end support 250 and bias bearing member 248 in a direction of the piezoelectric drive member. Representatively, pre-load members 252, 254 can be oppositely oriented 'V' shaped structures. One end of each of the 'V' shaped structures can be attached to movable end support 250 while the other end is attached to bearing member 248. In this aspect, the 'V' shaped structures will compress upon application of an outward force (i.e., an outward force in a direction of side wall 214) and expand back to a natural configuration when the force is removed. In particular, as can be seen from FIG. 2B, prior to insertion of piezoelectric drive member 108, pre-load members 252, 254 are in a natural or non-compressed configuration. When piezoelectric drive member 108 is inserted into inner frame 220 as shown in FIG. 2A, pre-load members 252, 254 compress to apply a pre-load force to lens support members 104, 106 so as to allow the appropriate friction between the surfaces, and the ability to transfer the forces to the associated lens assembly.

It is noted that although V-shaped pre-load members 252, 254 are illustrated, pre-load members 252, 254 may be formed by any type of resilient member suitable to perform the desired function, e.g., a coiled spring.

Similarly, lens support member 106 may include movable end support 258. Movable end support 258 may be resiliently connected to bearing member 256 by pre-load members 260, 262. Pre-load members 260, 262 may be similar to pre-load members 252, 254. Pre-load members 260, 262 may suspend bearing member 256 in front of movable end support 258 and bias bearing member 256 in a direction of the piezoelectric drive member. In this aspect, when the piezoelectric drive member is loaded into inner frame member 220, bearing end 236 frictionally engages bearing member 248 at a contact point and bearing end 238 frictionally engages bearing member 256 at a contact point as illustrated in FIG. 2A.

Each of bearing members 248, 256 and movable end supports 250, 258 are capable of a vertical motion as illustrated by arrows 264, 266. Pre-load members 252, 254, 260, 262 are configured such that the vertical motion of bearing members 248, 256 is substantially identical to the vertical motion of movable end supports 250, 258. Thus, during operation, a vibrational movement of piezoelectric drive member 108 causes one or both of bearing members 248, 256 to move in a vertical direction this in turn moves one or both of the movable end supports 250, 258 vertically (i.e. along an axis perpendicular to a direction of the preload force). The lens assembly can be mounted to movable end supports 250, 258 such that the vertical movement of one or both of movable ends supports 250, 258 causes a translational (e.g., vertical) or rotational (e.g., tilting) movement of the lens assembly. Bearing members 248, 256 and movable end supports 250, 258 may have any size and shape suitable for supporting a lens assembly and causing movement of the lens assembly in response to a movement of the piezoelectric drive member. In the illustrated embodiment, bearing members 248, 256 and movable end supports 250, 258 face one another and are formed by a base member having side walls extending therefrom. Other configurations, however, are contemplated.

Each of lens support member 104 and lens support member 106 is suspended within inner receiving portion 206 by one or more of resilient flexures 268, 270, 272, 274. Representatively, in one embodiment, lens support member 104 is suspended from top wall 208 of support frame 102 by resilient flexure 268 and from bottom wall 210 by resilient flexure 270. Lens support member 106 is suspended from top wall 208 by resilient flexure 272 and bottom wall 210 by resilient flexure 274. Each of resilient flexures 268, 270, 272, 274 are configured such that they are relatively compliant to motions orthogonal to the bearing surfaces (e.g., interfacing surfaces of bearing member 248 and end bearing 236), and yet stiff in the direction resisting a pre-load force of the piezoelectric drive member. For example, in one embodiment, each of resilient flexures 268, 270, 272, 274 may be substantially 'L' shaped structures in which the short arm is attached to the respective top or bottom wall of support frame 102 and the long arm is attached at its end to the respective movable end support 250, 258. The flexures resist the pre-load force largely by tension along the long arm portion of the structure.

In addition, resilient flexures 268, 270, 272, 274 are configured to resist parasitic tilting of the respective movable end supports 250, 258 'out of the plane' of support frame 102. This in turn, prevents tilting of the lens assembly attached to movable end supports 250, 258 in a similar direction. This may be accomplished by, for example, increasing a thickness of the short arm portion 276 of each of resilient flexures 268, 270, 272, 274, which is attached to support frame 102, such that it is thicker than the long arm portion 278. Short arm portion 276 is therefore substantially stiff during operational loads, but will deflect slightly during drop test and impact to allow movable end supports 250, 258 to hit the sideways end-stops 292 without breaking the long arm portion 278, which is in tension. This aspect is particularly important since actuator 100 may be implemented within a mobile device, which must be operable even after being dropped on a hard surface. In particular, manufacturing specifications require that mobile devices withstand what is commonly referred to as a "drop test." The drop test requires that the mobile device remain operable after being dropped multiple times from a specified distance above a concrete surface. Dropping of the device in this manner subjects the various components within the device to large impact forces.

Figure 2E:
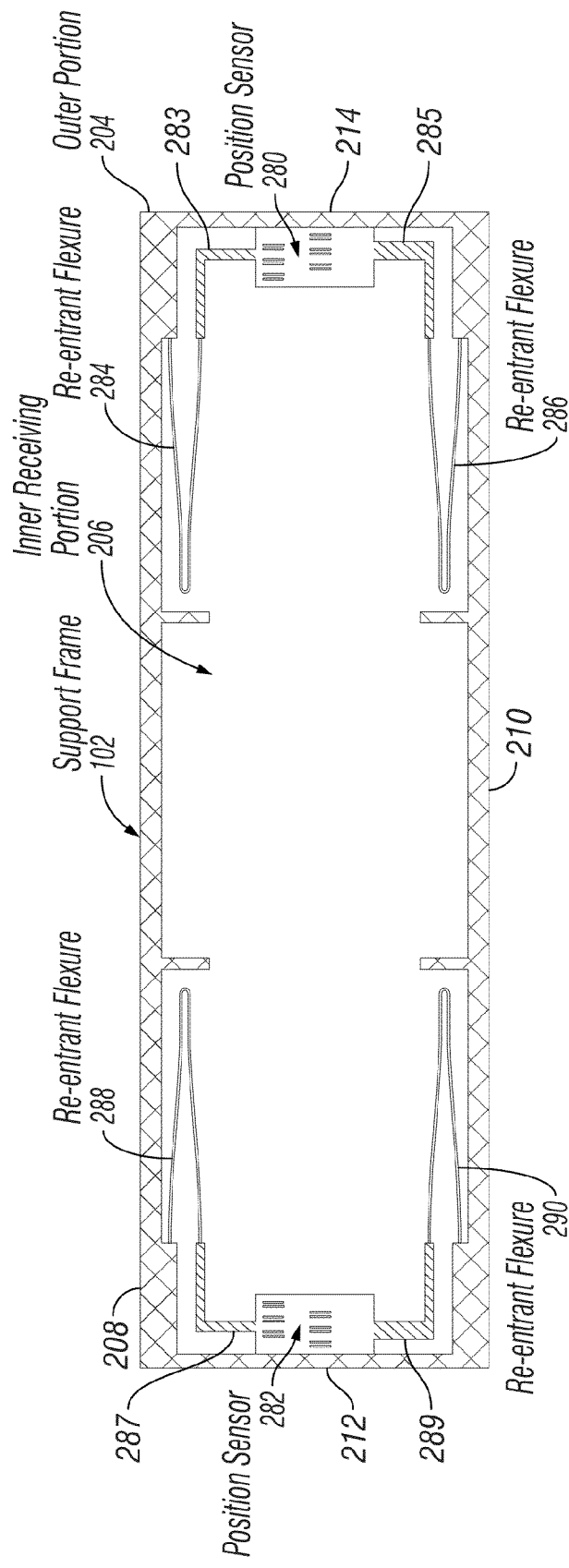
FIG. 2E illustrates a plan view of the position sensors of the actuator illustrated in FIG. 2A which move the associated lens assembly.
Figure 2F:
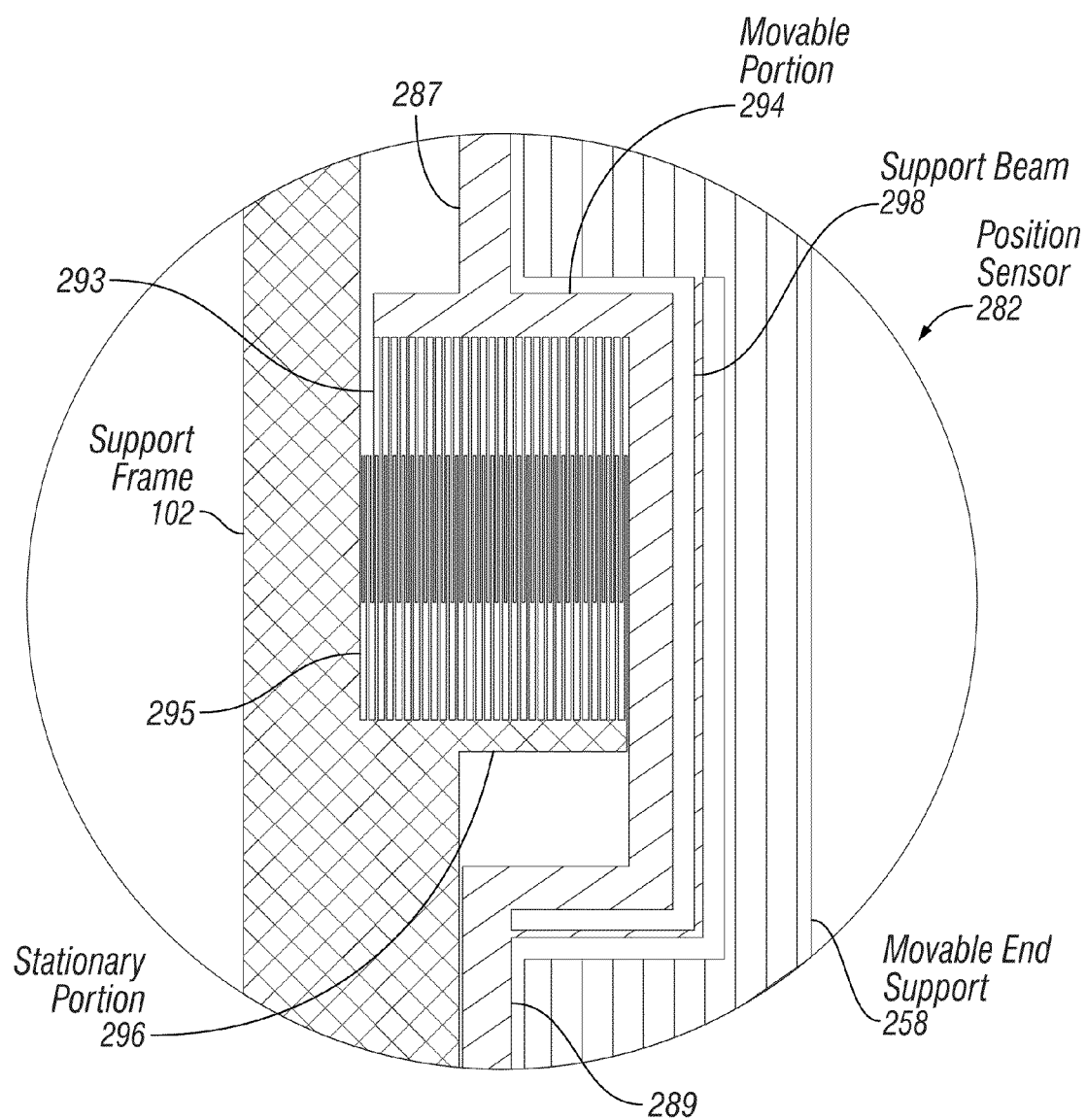
FIG. 2F illustrates a magnified view of the position sensors of FIG. 2E.

The motion of lens support members 104, 106 may be monitored by position sensors 280, 282 as illustrated by FIG. 2E and the magnified view of FIG. 2F. Position sensors 280, 282 are positioned between lens support members 104, 106 and their respective adjacent side walls 212, 214. In one embodiment, position sensors 280, 282 are electrostatic position sensors such as comb capacitive position sensors. As can be seen from FIG. 2F, position sensor 282 may have a stationary portion 296 attached to support frame 102 and a movable portion 294 attached to the movable end support 258 of lens support member 106. Stationary portion 296 may have fingers 295 which interlock with fingers 293 extending from movable portion 294. As lens support member 106 moves in the vertical direction, the movable portion 294 of sensor 282 also moves. The movement of the movable portion 294 with respect to the stationary portion 296 is then used to determine the degree of movement of the associated lens assembly. Although details of position sensor 282 are illustrated in FIG. 2F, it is contemplated that position sensor 280 is identical to position sensor 282 and therefore may also include a stationary portion attached to support frame and a movable portion attached to movable end support 250 of lens support member 104 to monitor movement of the associate lens assembly.

In one embodiment, position sensors 280, 282 are decoupled from lens support members 104, 106 to reduce parasitic motion of position sensors 280, 282. Representatively, there may be some parasitic motion of lens support members 104, 106 towards the center of support frame 102 as resilient flexures 268, 270, 272, 274 (see FIG. 2D) deflect by several microns. Such movement may interfere with the operation of position sensors 280, 282 since the movable portion of positions sensors 280, 282 are attached to lens support members 104, 106. In particular, the gaps between the fingers of the movable portion 294 and stationary portion 296 may be smaller than the degree of parasitic motion of lens support members 104, 106 on its four-bar-link suspension (i.e., resilient flexures 268, 270, 272, 274).

Decoupling is achieved by mounting position sensors 280, 282 to respective frame side walls using one or more of re-entrant flexures 284, 286, 288, 290 and flexure arms 283, 285, 287, 289, respectively. Re-entrant flexures 284, 286, 288, 290 are substantially resilient structures that allow the movable portion of the respective position sensor 280, 282 to move in the desired direction (e.g., in a direction parallel to the optical axis). Flexure arms 238, 285, 287, 289 are substantially rigid structures used to attach the desired portion of position sensors 280, 282 to the re-entrant flexure 284, 286, 288, 290. The movable portion 294 of each of position sensors 280, 282 is attached to the respective movable end support 250, 258 using a support beam 298 as illustrated in FIG. 2F. A similar support beam would be used with respect to position sensor 280. Since the movable sensor portion 294 is attached to the movable end support 250 or 258, when the movable end support 250 and/or 258 moves, movable sensor portion 294 also moves to a similar degree. This movement may be monitored to determine the degree of movement and/or position of movable end support 250 or 258, an in turn the associated lens assembly.

Support beam 298 may be a substantially 'L' shaped structure that is compliant in the direction of the parasitic motion (i.e., horizontal motion of movable end support 258 to the right as viewed in FIG. 2F), but stiff in the direction of desired motion (i.e., vertical motion of movable end support in FIG. 2F) of movable end supports 250, 258. It is noted that the short length of the short arm of support beam 298, which is orthogonal to the long arm in this case is not useful operationally, but helps to prevent drop-test failure by providing some compliance to allow some relative vertical motion between movable portion 294 and movable end support 258.

In addition, by suspending position sensor 280 and position sensor 282 from support frame 102 using re-entrant flexures 284, 286 and re-entrant flexures 288, 290, respectively, the nominal parasitic motion of one flexure (e.g., a translational motion in a horizontal direction as viewed from FIG. 2F) is cancelled by the nominal parasitic motion of the other. Thus, re-entrant flexures 284, 286 and re-entrant flexures 288, 290 are configured so that they nominally generate no parasitic motions, and hence maintain the alignment between the movable portion 284 and stationary portion 296 of the position sensors 280, 282.

Returning to FIG. 2A, as can be seen from this view, loading of piezoelectric drive member 108 within inner frame 220 causes inner frame 220 to expand to accommodate a length of piezoelectric drive member 108. This in turn pushes end bearing 236 and end bearing 238 into contact with bearing member 248 and bearing member 256, respectively. As previously discussed, bearing members 248, 256 are resiliently connected to movable end supports 250, 258, respectively, by pre-load members 252, 254, 260, 262. Upon compression, pre-load members 252, 254, 260, 262 provide the pre-load force between the bearing surfaces (i.e., surfaces of end bearings 236, 238 and bearing members 248, 256) so as to allow the appropriate friction between the surfaces, and the ability to transfer the forces to the associated lens assembly. End bearings 236, 238 have protrusions 240, 242, respectively, such that the pre-load force is applied at a single contact point on each of end bearings 236, 238.

The configuration and actuation modes of the piezoelectric drive member 108 will now be described in more detail in reference to FIGS. 3A-3C. In one embodiment, piezoelectric drive member 108 may be formed by a piezoelectric beam or plate having a substantially rectangular shape. It is contemplated, however, that piezoelectric drive member 108 may have other shapes and sizes depending upon the configuration of actuator 100. It is further contemplated that piezoelectric drive member 108 may be formed by a single piezoelectric plate structure or multiple plate like structures bonded together. Electrodes are positioned along the beam or plate structure as illustrated in FIG. 4 to drive movement of piezoelectric drive member 108.

Figure 3A:
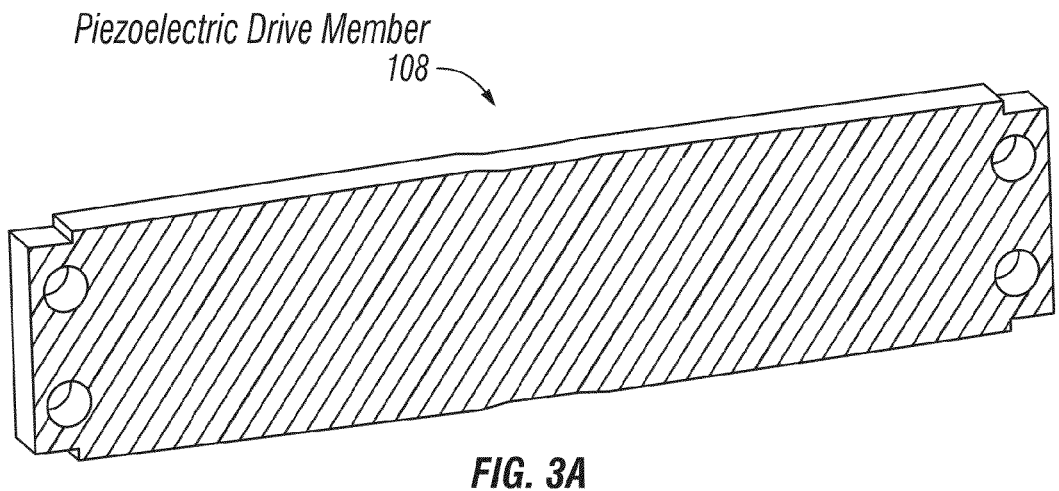
FIG. 3A is a perspective view of one embodiment of a piezoelectric drive member in a linear elongation mode.
Figure 3B:
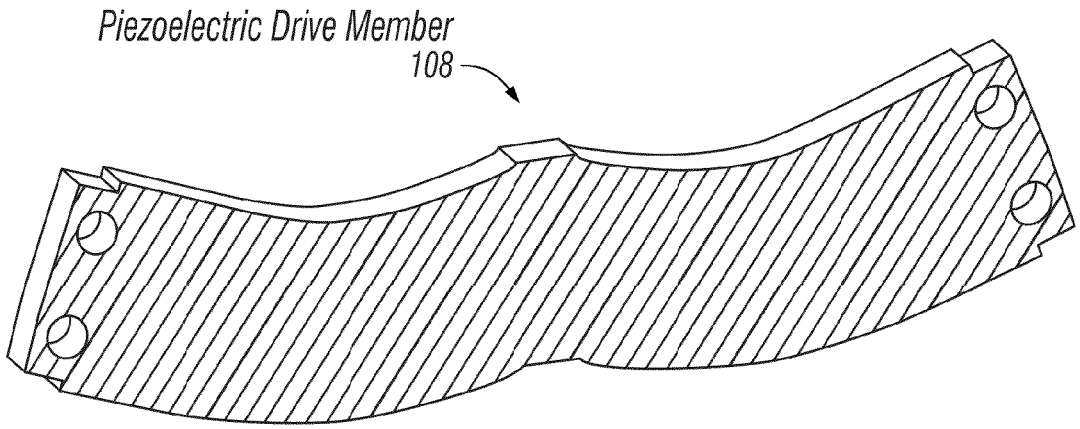
FIG. 3B is a perspective view of one embodiment of a piezoelectric drive member in a symmetrical second order bending mode.
Figure 3C:
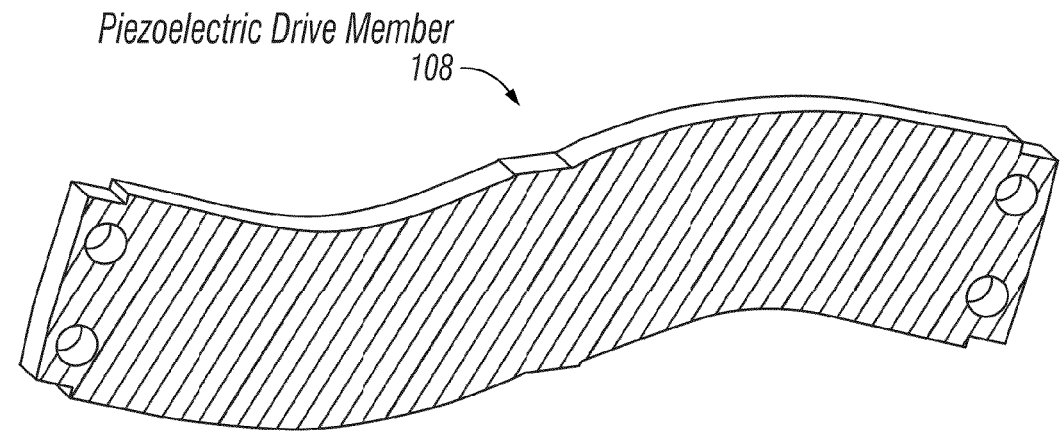
FIG. 3C is a perspective view of one embodiment of a piezoelectric drive member in an anti-symmetrical second order bending mode.
Figure 4:
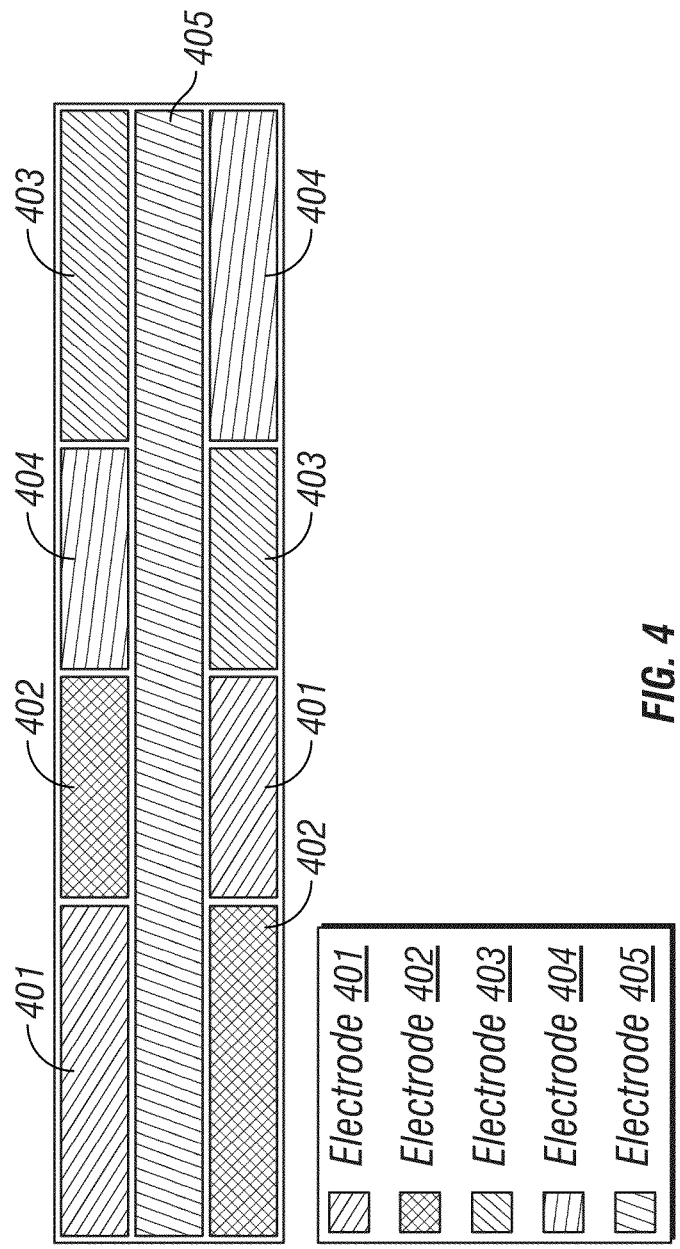
FIG. 4 is a plan view of one embodiment of an electrode configuration for the piezoelectric drive member of FIG. 2.

FIGS. 3A-3C show the relevant resonant modes of piezoelectric drive member 108 that are excited to drive actuator 100. In one embodiment, there are three resonant modes. The three resonant modes may be a linear elongation mode along the length of the piezoelectric drive member 108 (FIG. 3A), a second order bending mode where the two sides of piezoelectric drive member 108 move in phase (symmetrical) (FIG. 3B) and a second order bending mode where the two side of piezoelectric drive member 108 move in anti-phase with each other (anti-symmetrical) (FIG. 3C). The aspect ratio of piezoelectric drive member 108 is optimized so that these resonant modes all occur at very similar frequencies. For example, in one embodiment, where piezoelectric drive member 108 has a length of around 4.7 mm and a width of 1 mm, the piezoelectric material of piezoelectric drive member 108 results in resonant frequencies around 480 kHz. Since the phase of the response of piezoelectric drive member 108 varies right at resonance, a suitable drive frequency is one slightly different from all three modes. Representatively, in one embodiment, a drive frequency slightly below the lowest of the three modes may be used so that all modes operate in phase with the drive signal.

The electrode configuration allows for more than one mode to be excited at a time when driven. It may be appreciated that if the elongation mode shown in FIG. 3A and the bending mode shown in FIG. 3B are excited at the same time, the free ends of piezoelectric drive member 108 will move along an elliptical path, in the same direction, at high frequency. This may be referred to herein as the first actuation mode, which was previously discussed in reference to FIG. 1C. Assuming this occurs at a frequency that is higher than one or more of lens support members 104, 106 can respond to, owing to its inertia, this motion will tend to drive lens support member 104 and lens support member 106 along a direction substantially normal to the bearing surface of end bearings 236, 238 and in the direction that is the same as the elliptical motion when furthest from the fixed center of piezoelectric drive member 108, and hence with highest normal load and highest friction. This in turn, will result in a translational motion of the associated lens assembly in a direction parallel to its optical axis (i.e., an AF operation).

Alternatively, if the elongation mode shown in FIG. 3A and the bending mode shown in FIG. 3C are excited at the same time, the free ends of piezoelectric drive member 108 will move along an elliptical path, each in opposite directions. This may be referred to herein as the second actuation mode, which was previously discussed in reference to FIG. 1E. Assuming this occurs at a frequency that is higher than one or more of lens support member 104 and lens support member 106 can respond to, this motion will tend to drive lens support member 104 in a direction opposite lens support member 106. This in turn, will result in a rotational motion of the associated lens assembly (e.g., an OIS operation).

FIG. 4 illustrates a schematic view of one embodiment of an electrode configuration of piezoelectric drive member 108. In particular, the illustrated electrode allows for piezoelectric drive member 108 to drive two of the previously discussed modes at the same time. Representatively, electrodes 401, 402, 403, 404 and 405 are configured so as to drive nine different regions of piezoelectric drive member 108 with nine different signals. To reduce the drive voltage, piezoelectric drive member 108 can be formed as a co-sintered multi-layer plate, with at least one, and in some embodiments, plural, internal electrodes. In such a configuration, it is possible to achieve the same effect with a number of different directions of electric field between the various electrodes, depending on how the device is poled and then driven. Nevertheless the advantage of this configuration is that the piezoelectric material in each region is driven so as to produce the same net deformation as would have been the case were there only external electrodes on either side of piezoelectric drive member 108 driven with a voltage to produce the equivalent electric field. It is contemplated, however, that in other embodiments, external electrodes only on either side of piezoelectric drive member 108 may be used to drive movement.

When driven with such an electric field 'through the thickness' of piezoelectric drive member 108, the material deforms in different directions. It is noted that deformations through the thickness are not important to the operation of piezoelectric drive member 108. The deformations that are important are in the plane of piezoelectric drive member 108 and support frame 102. Considering the simplified case where there are only external electrodes in the pattern of nine regions, which are connected to appropriate voltage sources, an applied electric field in one region will cause shrinkage or expansion in the plane of piezoelectric drive member 108 and support frame 102, depending on the direction of the applied electric field. This is in comparison to the poling direction of piezoelectric drive member 108. Such deformation is proportional to the 'd31' strain coefficient, which equates electric field applied to resulting strain.

Given the mode shapes of the resonant modes, and the operation of the actuator 100, any deformations across the width of piezoelectric drive member 108 do not effect operation. The important direction is along the length of piezoelectric drive member 108.

Representatively, consider electrode 405, this electrode drives the central 'third' of piezoelectric drive member 108 (the exact proportion can be optimized to balance the movement of the modes). If electrode 405 is driven with an electric signal at a frequency close to the elongation mode shown in FIG. 3A, it may be appreciated that the resulting strain couples very well with this resonant mode, and hence the mode will be excited. If the drive frequency is somewhat below the resonant frequency, the resulting motion will be close to being 'in phase' with the drive signal.

Consider another embodiment where electrodes 401 and 403 are driven with the same signal, and electrodes 402 and 404 are driven with the same single that is opposite to the signal applied to electrodes 401 and 403. It may be appreciated that locally, one side of piezoelectric drive member 108 will expand, while the other contracts, causing a bending action. Since all these electrodes are split into two regions, the sense of this bending will be different towards the center than at the ends, corresponding with the bending mode of FIG. 3B (i.e., the symmetrical bending mode). In this case, it may be appreciated that these signals will couple well into the symmetrical bending mode shown in FIG. 3B.

Likewise, if electrode 401 and electrode 403 are driven with opposite sense drive signals, as are electrode 402 and electrode 404, yet, electrode 401 and electrode 402 are also driven with opposite signals, this drive will couple well into the anti-symmetric bending mode shown in FIG. 3C.

Whether the signal used to drive electrode 405 is the same or opposite to the signal use to drive electrode 401 will determine in which direction the elliptical of the ends of the piezoelectric drive member 108 will follow. This in turn will determine which direction lens support member 104 and lens support member 106 at each end will be moved.

It may also be appreciated that whether the electrodes are driven to couple to the symmetrical mode of FIG. 3B or the anti-symmetrical mode of FIG. 3C will determine whether lens support member 104 and lens support member 106 will be moved in the same direction or the opposite direction. In this way, it is possible to realize an actuator that can control the motion of the associated lens assembly in two degrees of freedom; in this case one linear and one rotary.

Given an appreciation of the basic operation of piezoelectric drive member 108, some of the further features of actuator 100 as a whole will now be described with reference to an exemplary assembly process. Representatively, in one embodiment, support frame 102, including the various inner components illustrated in FIGS. 2A-2E, is fabricated from a silicon wafer. Actuator 100 may be assembled by positioning support frame 102 on an assembly jig, which has pins that interface with hole 201 formed in mounting arm 122, and each of the pair of holes 203, 205 in end bearings 236, 238, respectively as illustrated in FIG. 2B. The jig is then manipulated to pull the silicon structures away from the placement region of the piezoelectric drive member, so as to make room for the drive member. In one embodiment, each planar dimension of piezoelectric drive member 108 is accurate to +/−50 μm. In this way, the mounting arm 122 may be moved 'upwards' by about 100 μm, since the nominal position has an interference of about 50 μm. Each end bearing 236, 238 is moved by around 325 μm, as there is nominally about 300 μm interference between the end bearings 236, 238 and piezoelectric drive member 108. In this way, the movement of end bearings 236, 238, compresses the structure of the pre-load members 252, 254, 260, 262, as illustrated in FIG. 2.

It is also noted that in moving end bearings 236, 238 to accommodate piezoelectric drive member 108 and generate the pre-load force on the contact surfaces (e.g., lens support members 104, 106), it is necessary to stretch inner frame 220 on which end bearings 236, 238 are mounted. Inner frame 220 is stretched using spring members 228, 230, 232, 234 as illustrated in FIG. 2A in which piezoelectric drive member 108 is inserted into inner frame 220.

In terms of providing electrical connections to position sensors 280, 282, various configurations are possible. Representatively, in one embodiment, the half of each of position sensors 280, 282 mounted to support frame 102 (e.g., stationary portion 296) can be split into two electrode regions, with half the fingers in each. Then the fingers in the moving half (e.g., movable portion 294) are all connected together electrically. In this way, in one embodiment, the comb is configured as two capacitors in series, where the central conductor is floating. This means that no electrical signal is required to be routed off the moving part of the comb.

Regarding the electrical connections to the various portions of the piezoelectric drive member 108, various configurations are contemplated. In one embodiment, the electrode configurations on piezoelectric drive member 108 may be routed such that all the connections are to the center of one side of member 108, e.g., proximate to mounting arm 124. Corresponding tracks may be deposited on portions of support frame 102 adjacent to this region. These are then joined during the fabrication process, possibly through a soldering process, or using conductive adhesive, or potentially even a wire-bonding process. In this way the troublesome requirement for multiple electrical connections to both drive piezoelectric drive member 108 and position sensors 280, 282 is accommodated. To connect actuator 100 to the appropriate power supply and drive electronics (e.g., piezoelectric drive circuit 110 illustrated in FIG. 1A, it may be advantageous to connect a flexible printed circuit (FPC) to support frame 102, with appropriate terminal pads. The power supply may supply an alternating current (AC) or a direct current (DC) to drive movement of piezoelectric drive member 108.

Figures 5A, 5B, 5C:
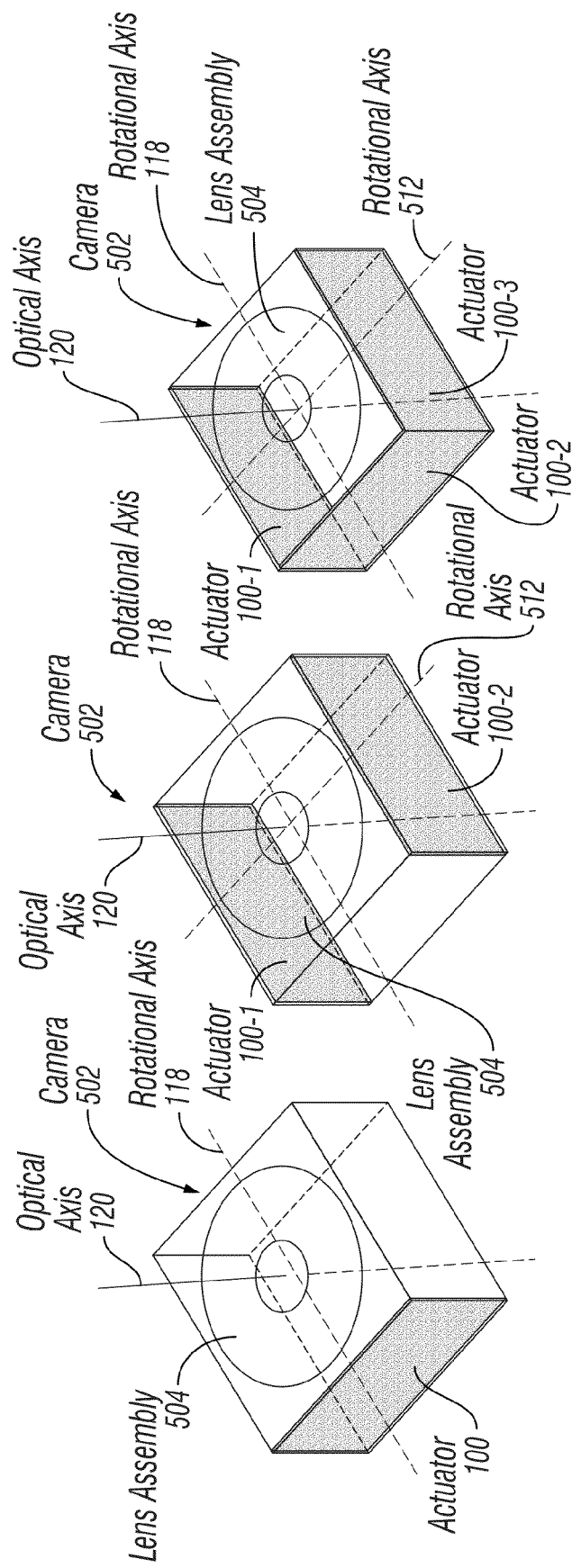
FIG. 5A is a perspective view of one embodiment of an actuator integrated within a camera module for an AF operation.
FIG. 5B is a perspective view of one embodiment of a pair of actuators integrated within a camera module for an OIS operation.
FIG. 5C is a perspective view of one embodiment of three actuators integrated within a camera module for an AF and OIS operation.

FIGS. 5A-5C illustrate possible implementations of the actuator within a miniature camera. FIG. 5A illustrates an actuator and camera configuration for an AF functionality. Representatively, in one embodiment, actuator 100 is mounted on one side of a camera module 502 having lens assembly 504. In this case, lens assembly 504 may be connected to lens support member 104 and lens support member 106 as previously discussed in reference to FIG. 1A. For the AF operation, only one degree-of freedom is required (e.g., a translation motion in a direction parallel to the lens optical axis 120). Thus, although actuator 100 is capable of driving a rotational movement of lens assembly 504 about rotational axis 118, which is orthogonal to optical axis 120, movement about rotational axis 118 is not required for AF. It is noted that since only one degree of freedom is needed for AF, the anti-symmetric bending mode of piezoelectric drive member 108 as illustrated in FIG. 3C is not required. In this aspect, the electrodes attached to piezoelectric drive member 108 could be configured into seven regions required to drive the first actuation mode as described in reference to FIG. 1C, rather than the nine regions illustrated in FIG. 4. Actuator 100 may, however, operate according to the second actuation mode, in which case, lens assembly 504 may tilt or rotate about rotational axis 118.

FIG. 5B illustrates an actuator and camera configuration for an OIS functionality. For an OIS functionality, which is used to compensate for user handshake, it is desirable for lens assembly 504 to be rotatable about two different axes orthogonal to each other and to the optical axis. Thus, in one embodiment, two of actuator 100 may be used. Actuator 100-1 may be mounted on one side of camera module 502 and actuator 100-2 may be mounted on an opposite side. In this case, lens support members 104 and 106, as previously discussed in reference to, for example FIG. 1A, may be connected to a structure that contains both the lens assembly and image sensor, and possibly a different AF actuator, in order to move the whole camera module is if it were a rigid body. OIS motion would consist of tilting this rigid body about one or more rotational axes 118, 512, which are orthogonal to the optical axis 120. The two actuators may act in concert to deliver a rotational degree of freedom about both rotational axes 118, 512. In this aspect, lens assembly 504 can tilt about two different rotational axes 118, 512 to compensate for user handshake.

In one embodiment, each of actuators 100-1 and 100-2 may have two controlled degrees of freedom (one linear, and one rotary) to achieve the OIS function. In another embodiment, the OIS functionality is achieved by tilting the whole camera with two actuators 100-1 and 100-2, each with one controlled degree of freedom. It is noted, however, that according to the latter embodiment, a real pivot point (like a ball and socket) about which the two actuators would need to pivot the camera is required. According to the former embodiment, no pivot point is required, rather it would be a 'virtual pivot'. It is for this reason that the two actuators may have two controlled degrees of freedom each. The use of the virtual pivot means that the point of rotation can be in the middle of the camera, close to the center of gravity. In this way the camera is 'suspended' on the two OIS actuators, and no real pivot is needed. A real pivot would need to be under the camera, out of the optical path, which may, however, add to the camera height.

FIG. 5C illustrates an actuator and camera configuration for an AF and OIS functionality. Representatively, to achieve both the AF and OIS functionality, three of actuators may be mounted to camera module 502. Actuator 100-2 may be mounted along one side of camera module 502 to deliver an AF functionality as described in reference to FIG. 5A. Two additional actuators 100-1 and 100-3 may be mounted along opposing sides of camera module 502 to deliver an OIS functionality as described in reference to FIG. 5B. It is noted, however, that although three actuators 100-1, 100-2 and 100-3 are illustrated for driving both the AF and OIS operation, it is contemplated that in an alternative embodiment, two actuators may be used to deliver both AF and OIS functionality. Representatively, two actuators, for example, actuators 100-1 and 100-2 positioned on adjacent sides of camera module 502 may be capable of driving movement of lens assembly 504 about optical axis 120 and rotational axes 118, 512. In particular, actuator 100-1 and actuator 100-2 may be used together or separately to drive movement of lens assembly 504 about optical axis 120 during an AF operation. Actuator 100-1 may also be used to rotate lens assembly 502 about rotational axis 118 while actuator 100-2 can be used to rotate lens assembly 504 about rotational axis 512 during an OIS operation.

Figure 6:
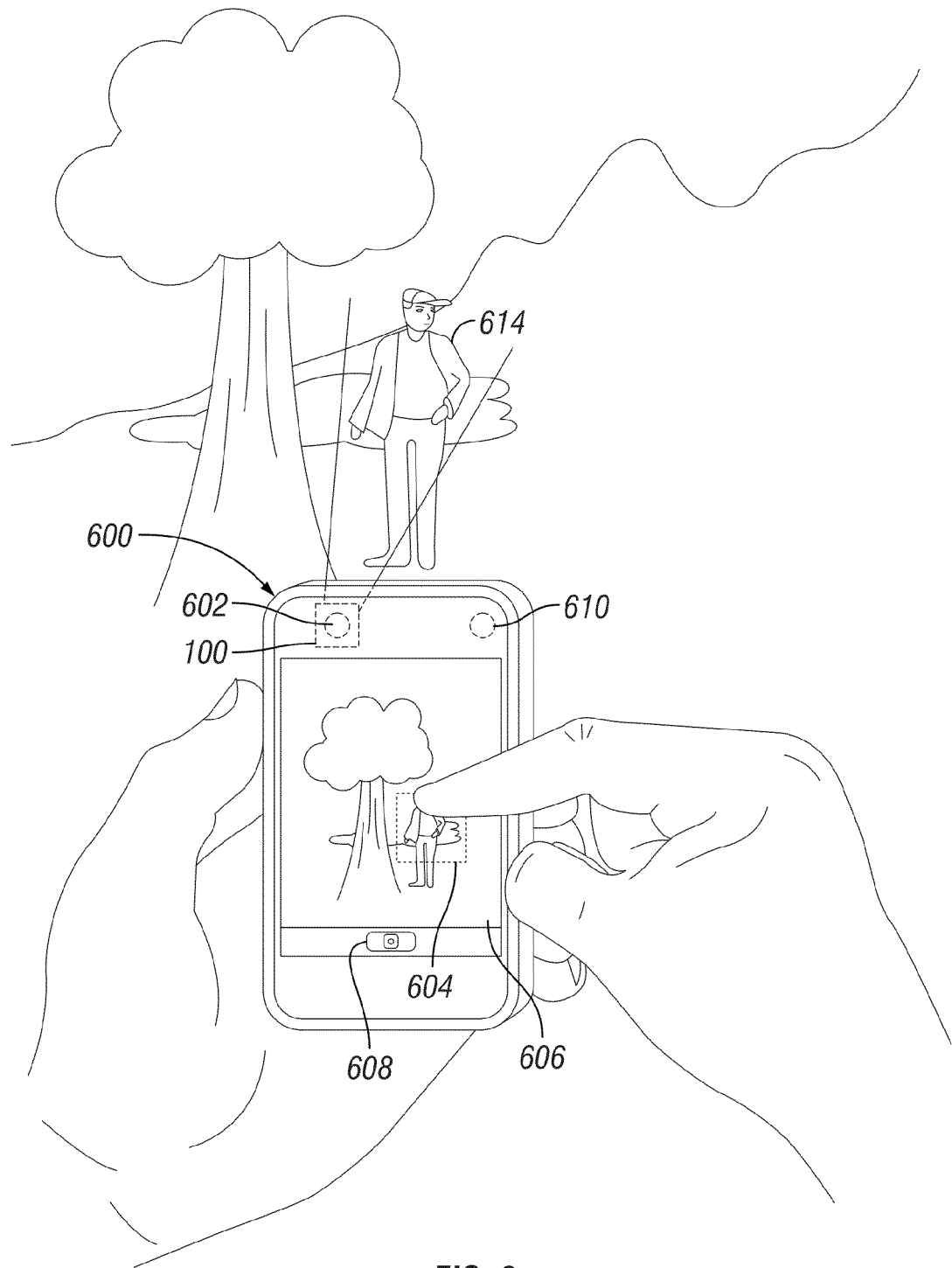
FIG. 6 is a perspective view of one embodiment of an implementation of an actuator within a mobile device.

FIG. 6 illustrates one implementation of the actuator described herein. Representatively, actuator 100 may be mounted within a miniature camera contained within a mobile device 600. Here, the user is making a manual or touch selection on the touch screen viewfinder, which is previewing an object of interest 614, at which the camera lens system 602, having actuator 100 therein, is aimed. The selection may be in the form of a target graphic 604 such as a contour that may be drawn by the user on the touch screen 606. Alternatively, the selection or target graphic 604 may be a fixed frame or a fixed solid area that moves with the user's finger across the screen 606. The actuator 100 moves the lens element mounted therein so that the object of interest 614 is in focus. A flash element 610 may further be provided to illuminate the object of interest 614. Once the user determines that the object of interest 614 is in focus, the user can capture the image by pressing virtual shutter button icon 608.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the actuator is described as a MEMS device for use in a miniature camera, it is contemplated that the size and dimensions of the actuator can be scaled to accommodate any size camera or other device requiring movement of a lens or other component similar to that caused by the actuator described herein. Still further, although use of the actuator in a mobile device is disclosed, it is further contemplated that the actuator may be used to drive movement of a lens element within any kind of camera, e.g., still and/or video, integrated within any kind of electronic device or a camera that is not integrated into another device. Representative non-mobile devices may include a desktop computer, a television or the like. In addition, the actuator may be formed from a material other than a silicon wafer, or the different actuator components may be formed from different materials and assembled after formation to form the actuator. The description is thus to be regarded as illustrative instead of limiting.

What is claimed is:

1. A micro-electro-mechanical systems (MEMS) lens actuator comprising:
a support frame having a stationary outer portion surrounding an inner receiving portion;
a piezoelectric drive member positioned within the inner receiving portion and attached to the stationary outer portion, the piezoelectric drive member having a first actuation mode and a second actuation mode; and
a first movable lens support member and a second movable lens support member frictionally engaged with opposing ends of the piezoelectric drive member at a contact point along each of the opposing ends using a preload force at the contact point, wherein in the first actuation mode, the piezoelectric drive member is capable of moving the first movable lens support member and the second movable lens support member in a same direction and in the second actuation mode, the piezoelectric drive member is capable of moving the first movable lens support member and the second movable lens support member in different directions.

2. The lens actuator of claim 1 wherein the support frame is substantially planar and the piezoelectric drive member remains substantially within the plane of the support member in the first actuation mode and the second actuation mode.

3. The lens actuator of claim 1 wherein the outer portion is substantially rectangular and a mounting arm extends into the inner receiving portion from one of a top wall or a bottom wall of the outer portion such that the piezoelectric drive member is suspended within the inner receiving portion.

4. The lens actuator of claim 1 wherein one of the first movable lens support member and the second movable lens support member comprise a resilient support member positioned at an end of the piezoelectric drive member, wherein the resilient support member frictionally engages an end of the piezoelectric drive member using a preload force caused by loading of the piezoelectric drive member within the inner receiving portion and actuation of the piezoelectric drive member moves the resilient support member along an axis perpendicular to a direction of the preload force.

5. The lens actuator of claim 1 further comprising:
an electrostatic position sensor to detect movement of the movable lens support member.

6. The lens actuator of claim 1 further comprising:
a resilient flexure extending from the stationary outer portion of the support frame to the movable lens support member to minimize parasitic tilting of the movable lens support member in a direction away from a plane of the support frame.

7. The lens actuator of claim 1 wherein the piezoelectric drive member is a substantially rectangular piezoelectric plate having an extension mode, a symmetrical bending mode and an anti-symmetric bending mode.

8. The lens actuator of claim 7 wherein the extension mode represents a linear elongation along a length of the piezoelectric plate.

9. The lens actuator of claim 7 wherein the symmetrical bending mode represents movement of opposing ends of the piezoelectric plate in phase with respect to one another.

10. The lens actuator of claim 7 wherein the anti-symmetric bending mode represents movement of opposing ends of the piezoelectric plate in anti-phase with respect to one another.

11. The lens actuator of claim 7 wherein the piezoelectric drive member comprises a plurality of electrodes electrically coupled to the piezoelectric plate, wherein in the first actuation mode, the piezoelectric plate is in the extension mode and the symmetrical bending mode, and in the second actuation mode, the piezoelectric plate is in the extension mode and the anti-symmetric bending mode.

12. The lens actuator of claim 1 wherein in the first actuation mode, the first movable lens support member and the second movable lens support member move an associated lens in a direction parallel to an optical axis of the lens.

13. The lens actuator of claim 1 wherein in the second actuation mode, the first movable lens support member and the second movable lens support member tilt an associated lens.

14. A micro-electro-mechanical systems (MEMS) lens actuator comprising:
 a support frame having a substantially planar outer portion surrounding an inner receiving portion;
 a piezoelectric drive member suspended within the inner receiving portion such that it is surrounded by the stationary outer portion, the piezoelectric drive member having a first actuation mode and a second actuation mode; and
 a first movable lens support member and a second movable lens support member positioned within the support frame and frictionally engaging opposing ends of the piezoelectric drive member, wherein in the first actuation mode, the piezoelectric drive member moves the first movable lens support member and the second movable lens support member such that an associated lens moves according to a first degree of freedom, and in the second actuation mode, the piezoelectric drive member moves the first movable lens support member and the second movable lens support member such that the associated lens moves according to a second degree of freedom different than the first degree of freedom.

15. The lens actuator of claim 14 wherein the first degree of freedom is a translation motion.

16. The lens actuator of claim 14 wherein the second degree of freedom is a rotational motion.

17. The lens actuator of claim 14 wherein one of the first actuation mode and the second actuation mode allow the actuator to perform an autofocus operation.

18. The lens actuator of claim 14 wherein one of the first actuation mode and the second actuation mode allow the actuator to perform an optical image stabilization operation.

19. An actuator module for driving a lens assembly, the actuator module comprising:
 a support frame having a stationary outer portion surrounding an inner receiving portion, the stationary outer portion having a top wall, a bottom wall and opposing side walls positioned around the inner receiving portion;
 a mounting arm extending into the inner receiving portion from one of the top wall or the bottom wall, the mounting arm dimensioned to suspend a piezoelectric drive member within the inner receiving portion;
 a resilient support member positioned at an end of the piezoelectric drive member, wherein the resilient support member frictionally engages an end of the piezoelectric drive member using a preload force caused by loading of the piezoelectric drive member within the inner receiving portion and actuation of the piezoelectric drive member moves the resilient support member along an axis perpendicular to a direction of the preload force;
 an electrostatic position sensor having a stationary portion and a movable portion, the stationary portion attached to the stationary outer portion of the support frame and the movable portion attached to the resilient support member to detect movement of the resilient support member along the axis; and
 a resilient flexure extending from the stationary outer portion of the support frame to the resilient support member to minimize tilting of the resilient support member in a direction away from the axis.

20. The actuator module of claim 19 wherein the actuator module is integrally formed from a silicon wafer as a single unit.

21. The actuator module of claim 19 wherein the resilient support member is a first resilient support member positioned at one end of the piezoelectric drive member, the actuator module further comprising:
 a second resilient support member positioned at an opposing end of the piezoelectric drive member.

22. The actuator module of claim 19 wherein the piezoelectric drive member is a substantially rectangular piezoelectric plate suspended along a middle portion by the mounting arm.

23. The actuator module of claim 22 wherein a bearing member is attached to an end of the piezoelectric plate so as to provide a point of contact between the resilient support member and the piezoelectric plate.

24. The actuator module of claim 19 wherein the electrostatic position sensor is an electrostatic comb drive.

25. The actuator module of claim 19 further comprising:
 a resilient inner frame member positioned within the inner receiving portion, the resilient inner frame member dimensioned to resiliently engage opposing ends of the piezoelectric drive member.

* * * * *